Sept. 15, 1970   P. O. HARKEN   3,528,645
BEARING BLOCK
Filed April 18, 1968

*INVENTOR.*
PETER O. HARKEN
BY *Russell W. Pyle*
ATT'Y

United States Patent Office 3,528,645
Patented Sept. 15, 1970

3,528,645
BEARING BLOCK
Peter O. Harken, 131 Emily St., Waukesha, Wis. 53186
Filed Apr. 18, 1968, Ser. No. 722,438
Int. Cl. B66d 1/36
U.S. Cl. 254—192                          2 Claims

ABSTRACT OF THE DISCLOSURE

A bearing block includes a sheave rotatably mounted on a shaft between side plates and has two sets of ball bearings separated by a central web depending from the sheave. The bearings contact the side plates, thereby preventing friction between the sheave and side plates. The block may include a cam and ratchet assembly permitting rotation of the sheave in one direction only.

---

This invention relates to bearing or pulley block and more particularly to a block fabricated from plastic materials that is especially suitable for use on sailboats.

An object of this invention is to provide a bearing block that is light in weight and relatively frictionless in operation.

Another object is the provision of such a block having a sheave that will rotate freely under stress and regardless of the angle and direction of a rope or cable thereon.

A further object is the provision of a bearing block that is free from corrosion and will resist attack from foreign abrasive particles, such as sand, dust, or the like.

Other objects will become apparent to those skilled in the art from the following description and appended claims, taken in connection with the accompanying drawing, wherein:

Figure 1:
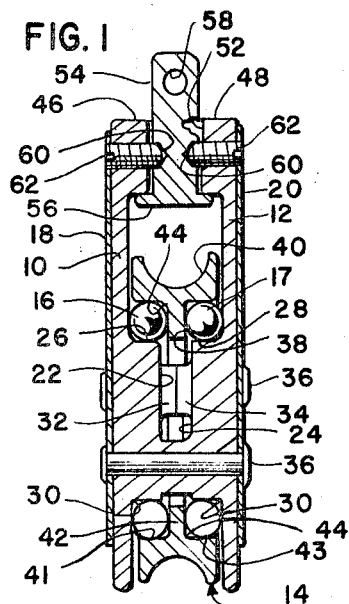
FIG. 1 is a transverse vertical sectional view of a bearing block that incorporates the features of the presently described invention.
Figure 2:
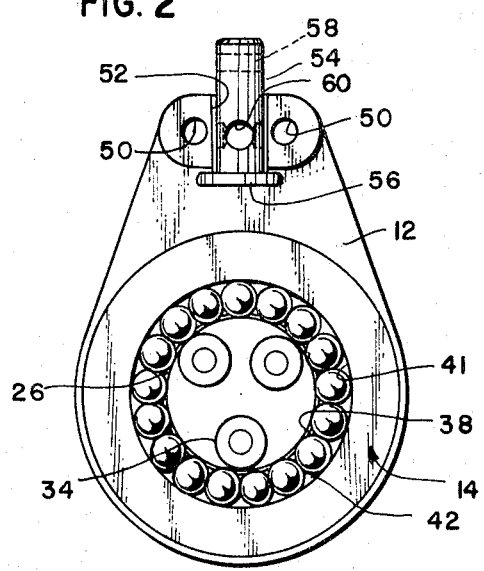
FIG. 2 is an elevational view, with one side plate removed, of the bearing block shown in FIG. 1.

With reference now more particularly to FIGS. 1 and 2 and to the reference numerals marked thereon, the bearing block generally comprises a pair of interconnected side plates 10 and 12 between which an annular sheave 14 is rotatably mounted. The side plates 10 and 12 and the sheave 14 are preferably composed of a thermoplastic, such as an acetal polymer or copolymer. Outer side plates 18 and 20, preferably composed of a metal such as stainless steel, may be additionally provided for extra strength.

A shaft between the lower portions of side plates 10 and 12 is formed by annular shoulders, 22 and 24, respectively, projecting inwardly from respective side plates and defining respective inner annular races 26 and 28 for receiving two respective sets of ball bearings 16 and 17. The ball bearing sets 16 and 17 are preferably composed of a plastic such as a polyamide or a polypropylene. Also, the ball bearing sets 16 and 17 are preferably formed from a material that is less hard than the material selected for the side plates 10 and 12, thereby confining the majority of wear, if any, to the ball bearings.

As shown in FIG. 1, the cross-sectional radius at the juncture 30 between the side plates 10 and 12 and their respective inner races 26 and 28 is smaller than the radius of the bearings 16 and 17, which causes the bearings to contact the side plates and inner races at points away from such junctures. This feature has been found to greatly reduce friction and wear on the bearings.

Each of the shoulders 22 and 24 also includes a plurality of corresponding opposed circular bosses such as 32 and 34, located around the rotational axis of the sheave 14, which bosses abut to hold the side plates 10 and 12 in a spaced relationship. Suitable fasteners 36, such as bolts, rivets or the like, are provided in the assembly described above through the bosses 32 and 34 to hold the assembly together.

The sheave 14, when viewed from the side as shown in FIG. 2, has the shape of an annulus, having a relatively large circular aperture 38 which is preferably of greater diameter than that of the shoulders 22 and 24 or otherwise spaced therefrom. As viewed in cross section in FIG. 1, sheave 14 is generally in the form of a T, the upper surface thereof having a rounded grooved section 40 for accepting and engaging a rope or other flexible member (not shown). A central web 42 extends radially inwardly from the grooved section 40 and separates the adjacent sets of ball bearings 16 and 17, while the lower surface of the grooved section 40 defines outer annular races 41 and 43 for the bearing sets 16 and 17. As shown in FIG. 1, the cross-sectional radius at the junctures 44 between the central web 42 and the grooved section 40 is smaller than the radius of the bearings 16 and 17, which causes the bearings to contact the outer races 41 and 43 and said web at points away from said junctures.

It may thus be seen that each bearing of the bearing sets 16 and 17 may contact the block at four locations: at one of the side plates 10 and 12, at one of the inner races 26 and 28, at one of the outer races 41 and 43, and on one side of the central web 42. The width of the widest portion of the sheave 14 is less than the combined diameters of both ball sets 16 and 17 and the web 42, which allows the sheave to rotate under stress without contacting the side plates 10 and 12.

Figure 3:
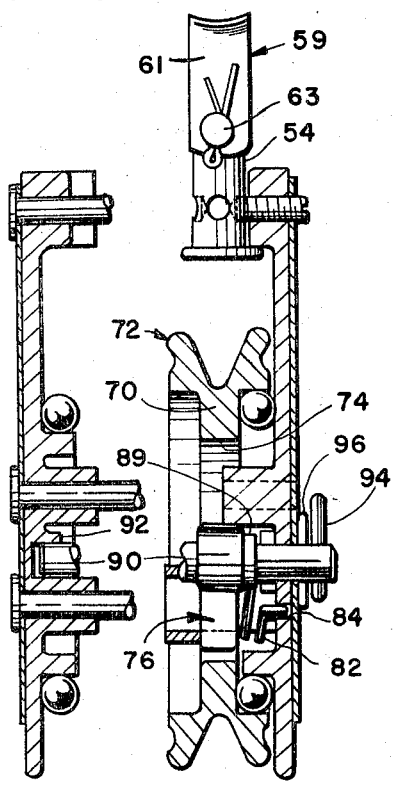
FIG. 3 is a transverse vertical sectional view, shown partially disassembled, of another embodiment of the presently described invention.
Figure 4:
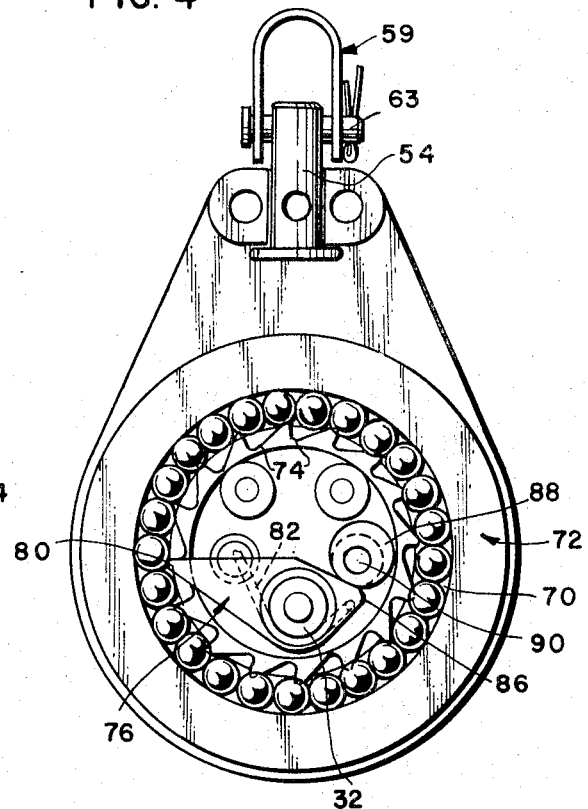
FIG. 4 is an elevational view, with one side plate removed, of the embodiment shown in FIG. 3.

The upper portion of each side plate 10 and 12 is provided with respective inwardly facing opposed shoulders 46 and 48, which abut and are held together through aligned apertures 50 (FIG. 2) by suitable fasteners, such as rivets or the like. A common vertical aperture 52 is provided through upper shoulders 46 and 48 to rotatably receive a vertical pin 54 having a retaining head 56 at the lower end thereof and a transverse aperture 58 near the upper end thereof for attachment to a desired location. For example, as shown in FIGS. 3 and 4, the vertical pin 54 may be attached to a conventional shackle 59 comprising a U-shaped member 61 the free ends of which are mounted by a suitable pin 63 through the transverse aperture 58.

A plurality of detents 60 are located in a common horizontal plane around the pin 54 intermediate the ends thereof and are engageable by a corresponding set screw 62 (FIG. 1) through one or both side plates, which allows the pin to be fixed in various rotational positions. The set screws 62 may be withdrawn from the detents 60 if desired, thereby allowing free rotation of the pin 54 in the vertical aperture 52.

It will be noted that in the construction of the bearing block described above, the diameter of the inner shoulders 22 and 24 defining the inner races 26 and 28 is preferably as great as possible, while the diameter of the sheave 14 is as small as possible consistent with its desired strength. In this manner, the ball bearing sets 16 and 17 are located as near the outer periphery of the sheave as possible, thereby maximizing the total bearing area and affording maximum support under heavy loads. The particular materials utilized in the construction of the present bearing block, along with other features hereinbefore described have been found to greatly reduce friction and wear without sacrifice of strength, notwithstanding the continual and sudden imposition of such high loads frequently associated with sailing.

In addition to the space between the sheave 14 and the side plates 10 and 12, the bearings of each of the bearing sets 16 and 17 are selected to be of a size such that there is a slight space or play between adjacent bearings. The space mentioned facilitate egress of dirt, sand and the like from the bearing block. Due to the particular materials utilized, no lubrication of the bearings is required, and therefore, such abrasive foreign particles will not accumulate between bearing surfaces.

Another embodiment of the invention is shown in FIGS. 3 and 4. The structure is substantially identical to that previously described, with the addition of a cam and ratchet assembly and other modifications, which will be described hereinafter in detail.

In this embodiment, the central web 70 of the sheave 72 is provided with a plurality of inclined teeth 74. A pawl 76 is rotatably mounted intermediate its ends around an axis offset from the rotational axis of the sheave 72, such as around one of the bosses 32. The pawl 76 is so mounted such that one end thereof 80 (FIG. 4) is engageable with the inclined teeth 74. A coil spring 82, one end thereof being engaged in an aperture 84 (FIG. 3) in one of the side plates 12, engages and resiliently urges the pawl 76 against the inclined teeth 74. The other end 86 of the pawl 76 is beveled for coaction against a circular cam 88 mounted on a washer 89 and eccentrically secured on a pin 90 rotatably mounted in the side plates 10 and 12. The pin 90, as best shown in FIG. 3, extends from an internal socket 92 in one of the side plates 10 and through an aligned opening in the other side plate 12 to the exterior of the block. Suitable means, such as a handle 94 secured to the free end of the pin 90 and a washer 96 disposed between the handle and side plate 12, is provided to facilitate manual rotation of the pin and cam externally of the block.

When the cam 88 is in the position shown, the spring loaded pawl 76 is allowed to contact and resiliently ride over the inclined teeth 74 during rotation of the sheave 72 in one direction, in this instance a clockwise direction. Rotation in the other or counterclockwise direction is prevented by the engagement of the pawl 76 between the inclined teeth 74. Upon rotation of the cam 88 by turning the handle 94 and pin 90, the end 80 of the pawl 76 is rotated away from and withdrawn from engagement with the inclined teeth 74, thereby allowing the sheave 72 to rotate freely in both directions.

While certain advantages, details of construction and design have been hereinbefore described in connection with the presently described invention, other improvements and modifications may obviously be made without departing from the scope of the appended claims.

Having thus described the invention, what is claimed is:

1. A bearing block comprising a pair of spaced side plates each having an inwardly projecting central shoulder having a circular periphery, means securing said side plates together with portions of said shoulders spaced apart to form a pair of axially spaced inner races, said means including bosses axially inwardly projecting from said side plates radially inwardly of said shoulders and mutually engaged for spacing said shoulders apart, an annular sheave rotatably mounted between said side plates having a central web projecting radially inwardly from its inner periphery and dividing said inner periphery into two outer races each spaced radially outwardly from one of said inner races, and a set of ball bearings on each side of said web contacting the respective inner and outer races, the juncture of each side of the web with the inner periphery of the sheave, and the juncture of each shoulder with the adjacent side plate, each being curved on a radius smaller than the radius of each of said balls, whereby said balls contact said side plates, web and peripheries along lines spaced from said junctures, said side plates and sheave being made of a plastic material and the balls are made of a different plastic material less hard than the first named plastic material whereby wear is substantially confined to said balls.

2. A bearing block as claimed in claim 1 in which said first named plastic material is an acetal polymer and said second named plastic material is a polyamide.

References Cited

UNITED STATES PATENTS

| 297,128 | 4/1884 | Garrett | 254—192 |
| 566,213 | 8/1896 | Mullen | 254—192 |
| 817,074 | 4/1906 | Rose | 254—192 |
| 964,672 | 7/1910 | Morrison | 254—192 |
| 1,185,179 | 5/1916 | Chattaway | 254—195 |
| 1,356,363 | 10/1920 | Hilgers | 254—192 |
| 2,170,238 | 8/1939 | Farmer | 188—82.3 |
| 3,294,446 | 12/1966 | Fontaine | 188—82.3 |

FOREIGN PATENTS

| 779,780 | 5/1968 | Canada. |
| 35,045 | 3/1928 | France. |
| 1,096,059 | 6/1955 | France. |

HARVEY C. HORNSBY, Primary Examiner

U.S. Cl. X.R.

254—195